United States Patent [19]

Nagao

[11] 4,094,011
[45] June 6, 1978

[54] SYSTEM FOR RECORDING AND REPRODUCING HOLOGRAM

[75] Inventor: Masao Nagao, Fuji, Japan

[73] Assignee: Asahi Kasai Kogyo Kabushiki Kaisha, Osaka, Japan

[21] Appl. No.: 671,615

[22] Filed: Mar. 29, 1976

[30] Foreign Application Priority Data

| Apr. 1, 1975 | Japan | 50-38567 |
| Aug. 29, 1975 | Japan | 50-104135 |
| Sep. 22, 1975 | Japan | 50-113737 |

[51] Int. Cl.² ............................................. G11C 13/04
[52] U.S. Cl. .................................. 365/216; 350/3.82; 358/132; 365/234
[58] Field of Search ................. 340/173 LM, 173 LT; 178/6.7 R; 350/3.5; 179/100.3 G

[56] References Cited

U.S. PATENT DOCUMENTS

| 3,891,976 | 6/1975 | Carlsen | 340/173 LM |
| 3,959,784 | 5/1976 | Meier | 340/173 LM |
| 3,964,032 | 6/1976 | Bardos | 340/173 LM |
| 3,971,002 | 7/1976 | Bricot et al. | 340/173 LT |

Primary Examiner—Stuart N. Hecker
Attorney, Agent, or Firm—Armstrong, Nikaido, Marmelstein & Kubovcik

[57] ABSTRACT

A system for recording and reproducing information using Fourier transform holography wherein original information to be recorded as holograms is divided into a number of groups each including $N (N \geq 2)$ information units, each unit including a given amount of information. This information is recorded by a holographic technique on a track or tracks of a record medium as a series of holograms from a plurality of unit-information input positions, or from a single unit-information input position when a reference light having a plurality of incident angles is used. In reproducing, the images either analog or digital are reproduced such that images reproduced from adjacent holograms in the series of holograms on the track appear at, at least two different positions on an image plane of a reproducing system such as pickup tubes or a photodiode array. In this way, optical crosstalk between adjacent holograms which would otherwise occur in sequentially reading out a number of holograms can be avoided and the information can be read out correctly.

20 Claims, 23 Drawing Figures

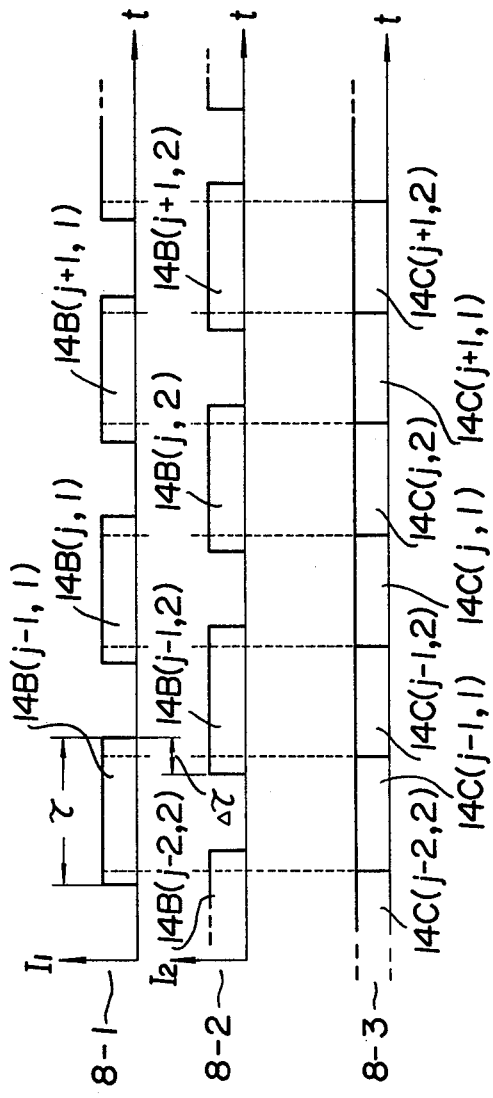

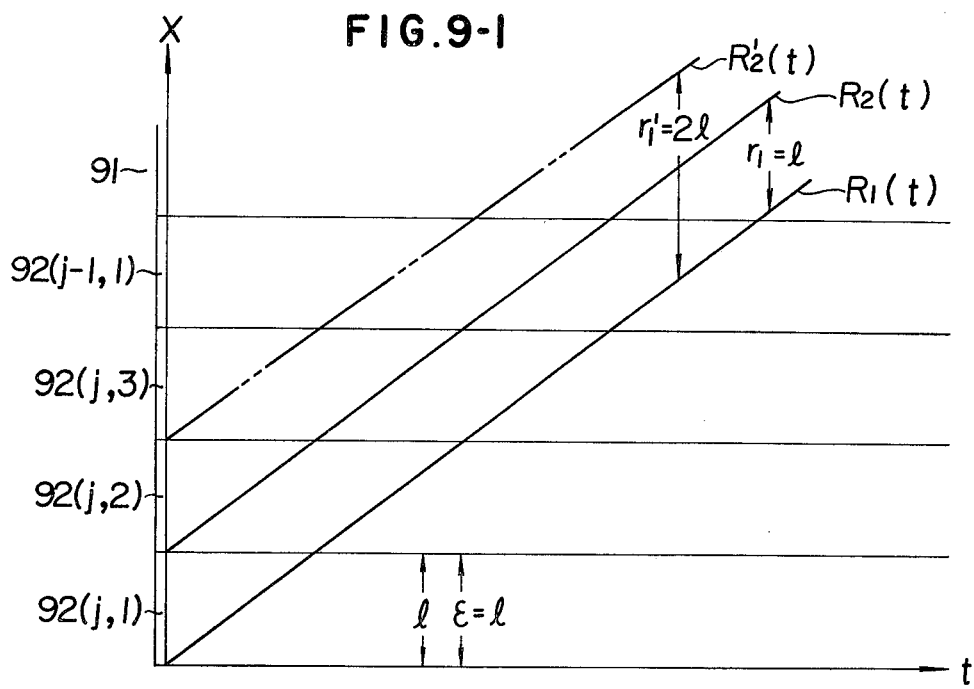
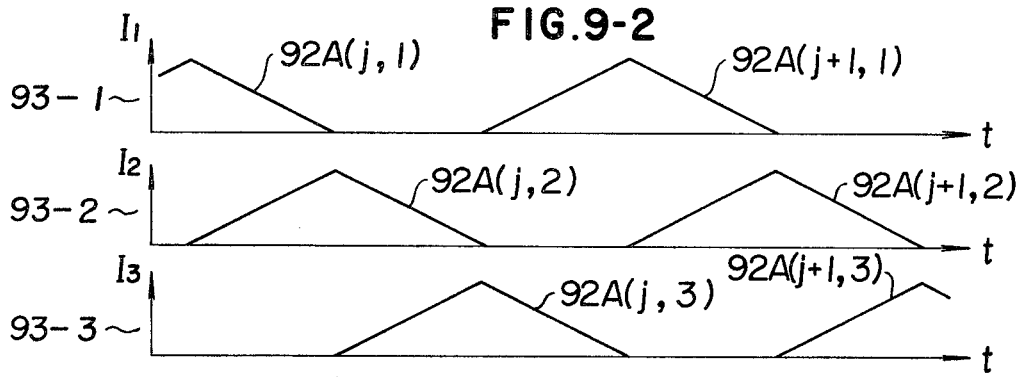
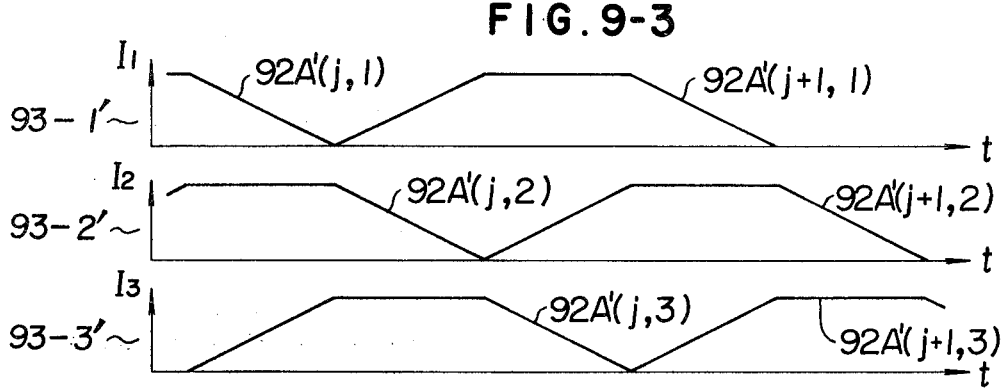

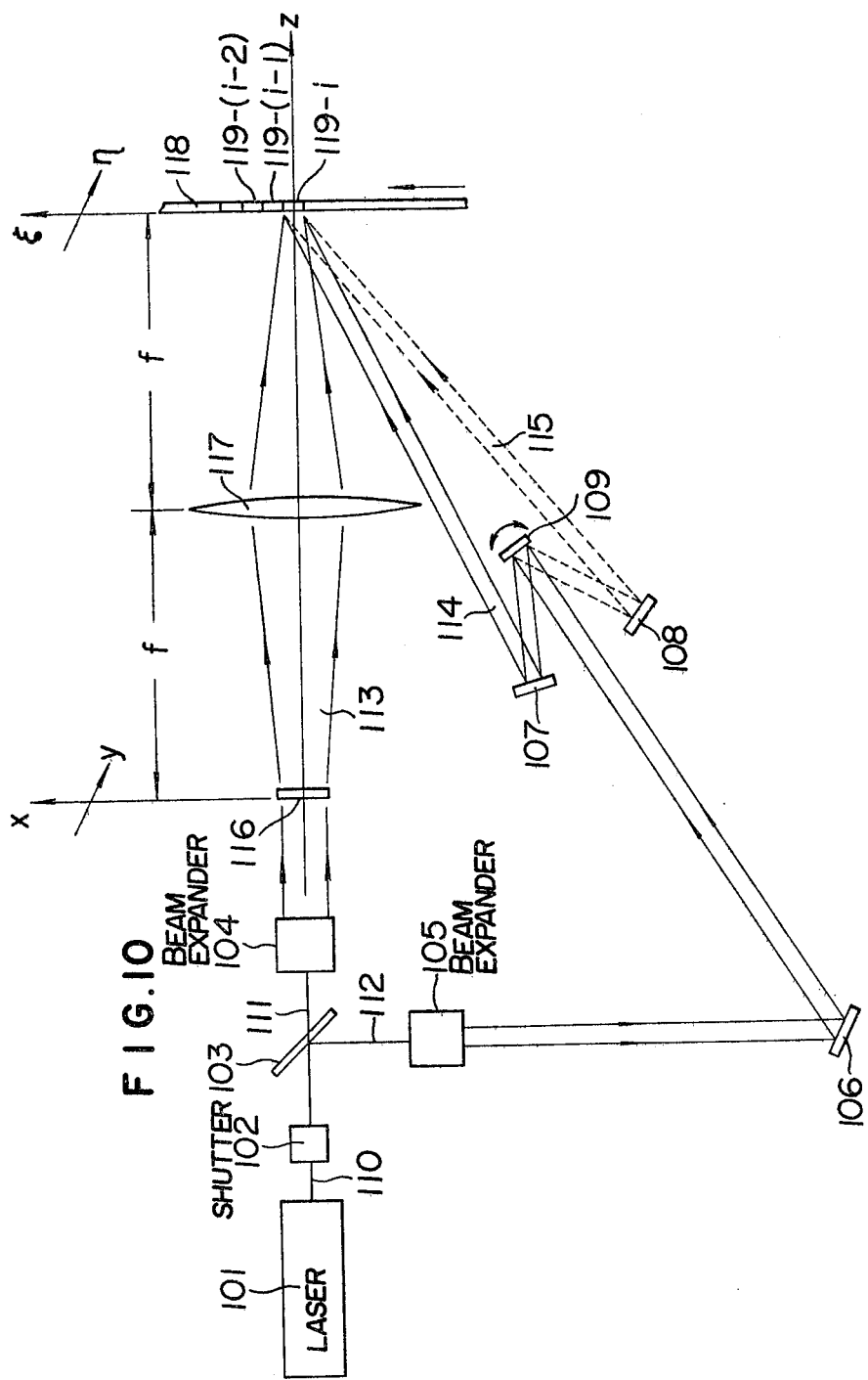

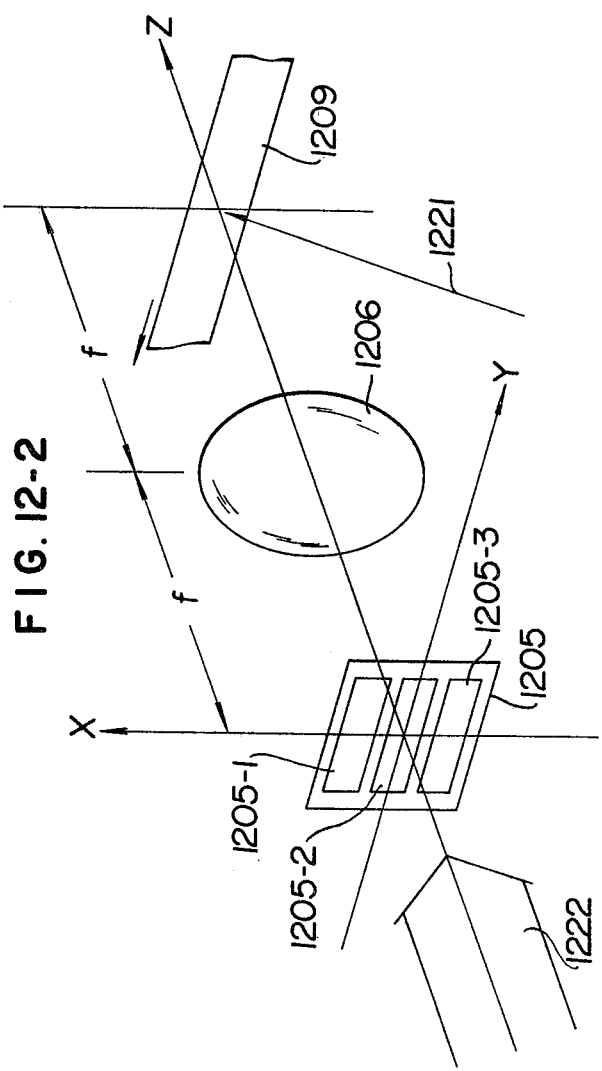

SYSTEM FOR RECORDING AND REPRODUCING HOLOGRAM

The present invention relates to a system for recording and reproducing information using Fourier transform holography, and more particularly to such a system and a method which eliminate crosstalk between adjacent holograms and enables continuous reproduction.

One of the characteristics of the Fourier transform holography is the image immobility due to the shift function of the Fourier transform. By this function, even if the hologram progresses on a hologram plane, an image from the hologram is reproduced in the same position on an image plane. Accordingly, when a hologram is to be read from one end to the other end, the above characteristic of the Fourier transform hologram can be directly utilized. One example of such a system is disclosed in U.S. Pat. No. 3,657,473 issued to John W. Corcoran on Apr. 18, 1972. When the amount of information is small such as in an identification card or credit card, all information can be recorded in one hologram and the required information can be retrieved by reproducing that hologram. However, when the amount of information is large as is the case of a computer tape, it is not generally possible to record the whole of the information in one hologram. In this case, the original information must be divided and recorded in a plurality of holograms. When those divided original information is recorded as a number of Fourier transform holograms a track or tracks of a film and those holograms are sequentially read out by continuously illuminating reproducing light while moving the film, optical crosstalk between adjacent holograms occurs on the imaging plane so that the information cannot be read out correctly. Namely, although the function of the image immobility in the Fourier transform holography presents an advantage of the reproduction of an image at a fixed position independently of the position of the hologram, it also brings about a disadvantage of reproducing the images from adjacent holograms at the same image position so that the individual information cannot be retrieved correctly. The present invention provides means for resolving the problems encountered in the use of Fourier transform holography. It is possible, by a known method, to prevent the simultaneous reproduction of two adjacent holograms, for example, by setting a sufficiently wide gap between adjacent holograms and setting the diameter of reproducing light beam to less than the size of the hologram. However this approach cannot resolve the problem of the decrease in effective record density of the record medium. It is another object of the present invention to resolve the above problem.

When information is read out of a computer magnetic tape, it may be effected asynchronously. However, when a PCM (pulse code modulation) coded audio signal is read out, it is desirable that bit information is read out of the record medium in synchronized form. It is yet another object of the present invention to allow continuous reproduction, in time sequence, of PCM coded audio signal bit information recorded on a number of Fourier transform holograms.

Regarding the arrangement of bit information recorded on the hologram, a one-dimensional bit array is shown in many references. However, this type of arrangement does not increase the record density of the record medium. It is a further object of the present invention to provide a system which enables the reproduction of information from a number of holograms having two-dimensional bit information recorded, in synchronous or asynchronous manner while eliminating the crosstalk between adjacent holograms.

The above objects relate to the system for recording a reproducing a hologram without causing crosstalk between adjacent holograms in the same track. When a number of holograms are recorded along the track, they may be recorded on one track but usually they are recorded in a plurality of tracks extending longitudinally of the film or tranversely. In this case, in order to prevent crosstalk between adjacent tracks, the illumination area by the reproducing light should not overlap an adjacent track. To this end, a gap between the tracks should be set wide or a diameter of the reproducing light beam which is transverse to the direction of scan should be confined to the same order as the track width. It is another object of the present invention to provide a reproducing method which allows the elimination of optical crosstalk between adjacent tracks on an imaging plane of a reproducing optical system even when a plurality of hologram tracks are closely arranged.

It is yet another object of the present invention to permit a large allowable tolerance in the diameter of the reproducing light beam in a reproducing system which diameter is transverse to the direction of scan, without sacrificing a mean record density on a hologram record medium.

It is yet another object of the present invention to allow proper reproduction of the hologram even when the adjacent tracks are recorded in partially overlapped manner and hence to increase the mean record density on the record medium.

It is yet another object of the present invention to provide a recording method which enables the above reproducing methods.

In the present invention, at least two substantially non-overlapping image positions are provided on an image plane of a Fourier transform hologram reproducing optical system, and photoelectric transducer means are arranged at respective positions. Assuming two such positions for simplification, an image is reproduced from a first hologram among a number of holograms to be reproduced, to the first image position, another image is reproduced from a second hologram to the second image position, and another image is reproduced from a third hologram to the first position, and so on. In this manner the optical crosstalk between the reproduced images from adjacent holograms can be eliminated. Furthermore, by setting the diameter of a reproducing light beam to span over two adjacent holograms, while information can be read out from the crosstalk-free image reproduced from the first hologram by the first photoelectric transducer means, a crosstalk-free image can be reproduced from the second hologram on the second photoelectric transducer means. Consequently, in addition to asynchronous reproduction of the information, the information can be continuously reproduced in synchronous manner. While the holograms arranged in one track have been considered, by separating the image reproducing positions for adjacent tracks, a gap between the tracks can be narrowed and the mean record density can be further increased.

To record the hologram which assures the separation of the image reproducing positions of adjacent holograms, a plurality of substantially non-overlapping information input positions may be provided on an information input plane of a Fourier transform hologram recording optical system. Alternatively, it may be attained by a single information input position and a reference light having a plurality of incident angles.

The foregoing and other objects, features and advantages of the present invention will become more apparent from the following detailed description of the preferred embodiments of the invention when taken in conjunction with the accompanying drawings, in which;

FIG. 8 is a time sequence chart of the information reproduction corresponding to FIG. 7.

FIG. 10 shows one embodiment of the method of recording Fourier transform hologram of the present invention which is different from FIG. 1.

A method of dividing original information to be recorded in the hologram is first explained. The original information is divided into a number of information groups each including a given number N ($N \geq 2$) of information units each including a given amount of information. For example, where the original information is animation recorded on a movie film, one frame of the movie film constitutes one information unit, and two frames or two information units forms one information group ($N = 2$). In this manner the entire animation of the movie film is divided into a number of information groups alternatively, three frames or three information units ($N = 3$) may constitute one information group to divide the entire animation of the movie film into a number of information groups. While many dividing methods may exist, an appropriate dividing method is employed considering the configuration of the hologram recording optical system and the reproducing optical system. As another example, where the original information is bit information recorded on a computer magnetic tape, one digit (e.g. 9 bits) of the bit information constitutes one information unit, and four digits (36 bits) or four information units ($N = 4$) constitute one information group. In this manner the whole of the bit information of the magnetic tape is divided into a plurality of information groups. In any case, the original information is divided into a number of groups each consisting of N information units and one information unit is recorded in one hologram as a Fourier transform hologram, and a number of holograms are arranged in a track or tracks. In the Fourier transform hologram reproducing optical system, N image reproducing positions per channel are provided in an image plane. The respective hologram is assigned with a unit number and a group number corresponding to a unit number and a group number of the divided original information. The image reproducing positions from the holograms are thus specified only by the unit number independently of the group number of the hologram. One example of recording the holograms in the above manner is explained with reference to FIG. 1.

Figure 1:
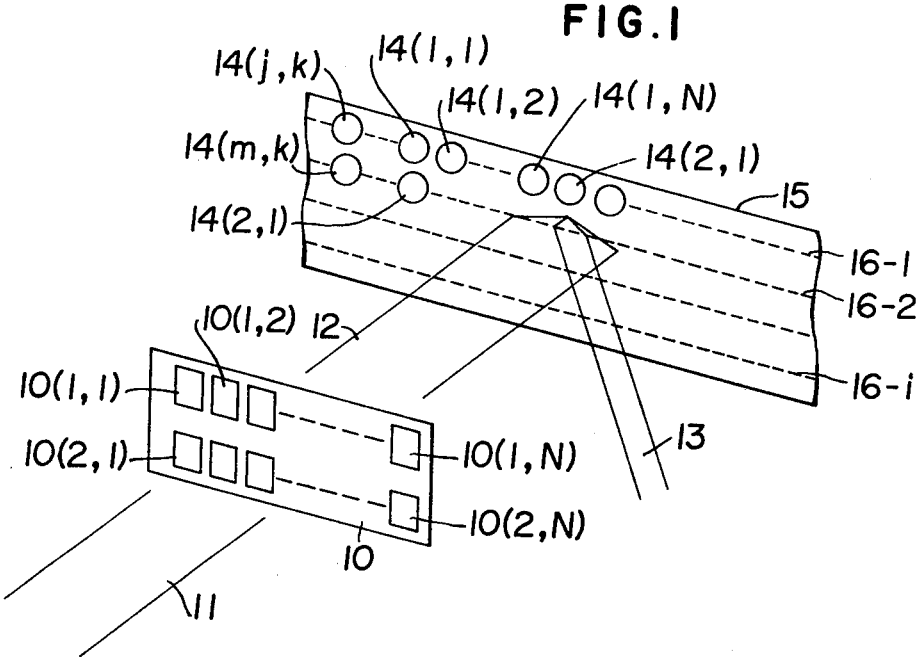
FIG. 1 illustrates a principle of recording Fourier transform hologram in accordance with the present invention.

FIG. 1 shows an information input section of the Fourier transform hologram recording optical system and a record medium, in which a laser device, a recording lens system and a shutter, etc. are omitted. It comprises an information input apparatus 10, a hologram 14 and a record medium 15 in the form of tape. The information input device 10 comprises two channels of N unit-information input device 10 (1, 1), 10 (1, 2), ... 10 (1, N) and 10 (2, 1), 10 (2, 2), ... 10 (2, N). Each of the unit-information input devices has a capacity capable of receiving one unit-information. For example, when one information unit consists of 16 bits and $N = 3$, the information input device 10 may be a page composer consisting of a 6-row, 16-column bit array. The page composer may use a liquid crystal or an electro-optical crystal, or it may use a 35 mm film. A laser beam 11 is modulated by the unit-information input device 10 ($s$, $k$) (where $s = 1, 2$; $k = 1, 2, \ldots N$), and Fourier transformed by a lens system not shown to produce a signal light beam 12. A reference light beam 13 is generated from the same laser device as the laser beam 11 is generated. The signal beam 12 and the reference beam 13 interfere on the record medium 15 located in a Fourier transform plane of the system to form the Fourier transform hologram 14. On the record medium, a number of holograms 14 are arranged and recorded on a number of tracks 16. The unit-information devided from the original information to be hologram-recorded is represented by D ($j$, $k$), where $j$ ($= 1, 2, 3 \ldots$) represents a group number and $k$ ($= 1, 2, \ldots N \geq 2$) represents a unit number. First, a unit-information D (1, 1) is applied to an information input device 10 (1, 1) to record a hologram 14 (1, 1), then a unit-information D (1, 2) is applied to an information input device 10 (1, 2) to record a hologram 14 (1, 2), and so on and a unit-information D (1, N) is applied to an information input device 10 (1, N) to record a hologram 14 (1, N). Subsequently, a unit-information D (2, 1) is applied to an information input device 10 (1, 1) to record a hologram 14 (2, 1). In the same manner, using the unit-information input devices 10 (1, $k$) in the first channel, the unit-information D ($j$, $k$) are recorded on a first track 16-1 on the hologram record medium 15. Then, to record holograms on a second track 16-2, the unit-information D (j, k) are applied to the unit-information input devices 10 (2, k) of a second channel. In a similar way, using the unit-information input devices of the first channel, holograms are recorded on odd-numbered tracks, and using the unit-information input devices of the second channel holograms are recorded on even-numbered tracks.

Figure 2:
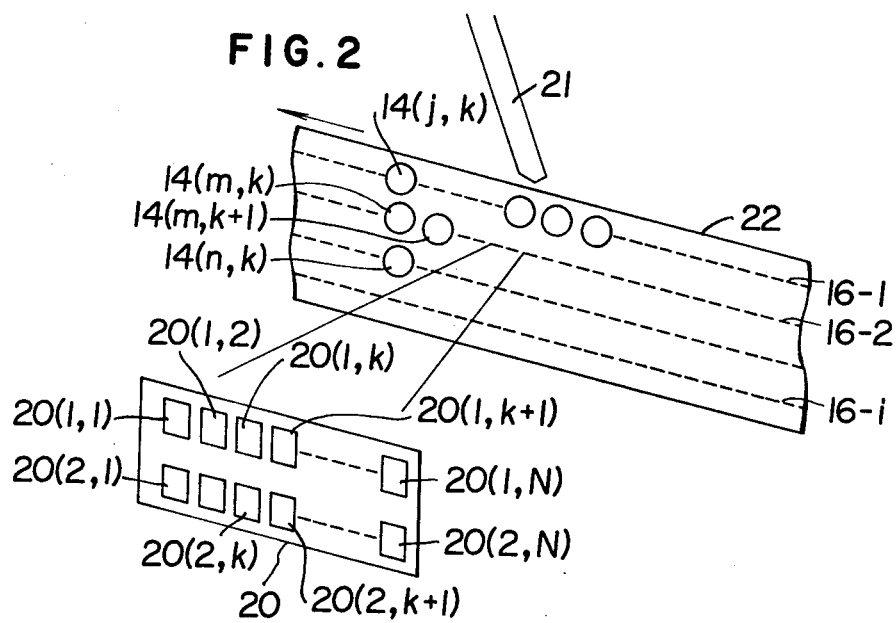
FIG. 2 illustrates a principle of reproducing Fourier transfer holograms in accordance with the present invention.

A method for reproducing the holograms thus recorded is explained with reference to FIG. 2. FIG. 2 particularly illustrates a hologram tape in a Fourier transform hologram reproducing optical system, and a photoelectric transducing apparatus. A laser device, reproducing lens system or the like are omitted from the drawing. The photoelectric transducing apparatus 20 is arranged on an image plane of the optical system at a real image reproducing position. Numeral 21 represents a reproducing light beam, and 22 represents the hologram tape which is derived by developing the record medium 15 shown in FIG. 1. Numerals 14 and 16 represent the hologram and the track, respectively, as in FIG. 1. In FIG. 2, the hologram tape 22 is continuously moving in the direction of the arrow, and the holograms are relatively scanned by the reproducing light beam 21 along the track. To scan a different track, the reproducing light beam 21 may be moved in parallel to illuminate a desired track. The photoelectric transducing apparatus 20 comprises two channels of N unit-information photoelectric transducing devices (hereinafter referred to as unit-information detectors) 20 (1, 1), 20 (1, 2), . . . 20 (1, N) and 20 (2, 1) 20 (2, 2), . . . 20 (2, N), which correspond to the information input devices. Each of the unit-information detectors is adapted to convert optical images reproduced from the holograms into electric signals. For example, when the information are bit information, a phototransistor array may be used. In FIG. 2, images from the holograms 14 (j, k) are reproduced on the unit-information detectors of either the first channel or the second channel, depending on whether the track on which the holograms have been recorded is an odd-numbered or even-numbered, and the images from the holograms in the same track are reproduced to a position specified only by the unit number k independently of the group number j of the hologram 14 (j, k), in other words at a position 20 (s, k) where s = 1 or 2), as will be apparent to those skilled in holography technology from the above description relating to the recording method.

Assuming that $r_2$ represents a diameter of the reproducing light beam which is transverse to the direction of scan, it has been necessary in prior art method to select $r_2$ such that the beam does not overlap a next adjacent track. According to the present invention, $r_2$ may be selected such that the beam does not overlap a next but one track. Accordingly, an allowable tolerance to $r_2$ can be widened. This is explained in conjunction with FIG. 3.

Figure 3:
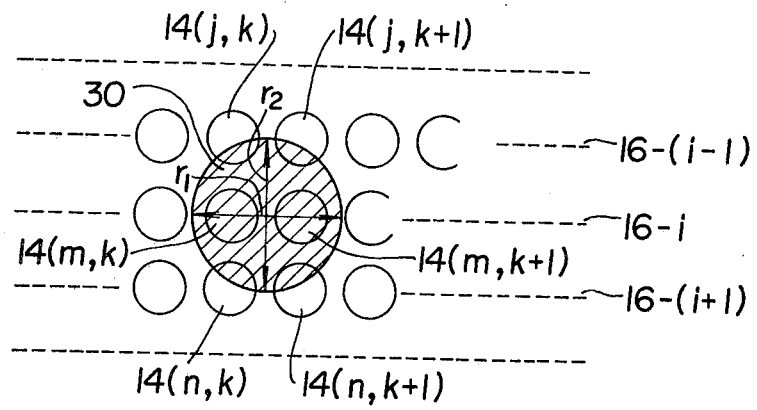
FIGS. 3 and 4 show examples of a hologram record format and reproducing light projection area in the hologram reproducing method of the present invention.

In FIG. 3, numeral 30 represents the area illuminated with a reproducing light beam, the dimension of which is $r_1$ in diameter along the direction of scan and $r_2$ in diameter transversely thereto. The reproducing light beam is shown as scanning over i-th track 16-i. Since $r_2$ is larger than the track width, the reproducing light beam overlaps the tracks 16-(i−1) and 16-(i+1). However, as seen from FIGS. 1 and 2, the holograms on the (i−1)th track and the holograms on the (i+1)th track are reproduced on the unit-information detectors in the same one channel and the holograms on the i-th track are reproduced on the unit-information detectors in the other channel. Namely, in FIG. 3, if i is an even number, the holograms 14 (m, k) and 14 (m, k+1) are reproduced separately on the unit-information detectors 20 (2, k) and 20 (2, k+1), respectively, shown in FIG. 2, while the holograms 14 (j, k) and 14 (n, k) are both reproduced on the unit-information detector 20 (1, k) in overlapped manner and the holograms 14 (j, k+1) and 14 (n, k+1) are both reproduced on the unit-information detector 20 (l, k+1), in overlapped manner. Accordingly, in reproducing the holograms in the i-th track no crosstalk with the (i±1)th tracks (the next adjacent tracks) occurs.

Figure 4:
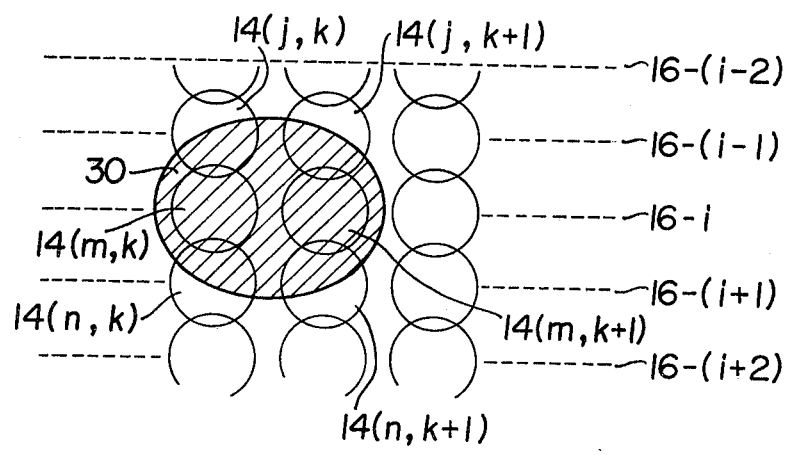

While gaps are provided between tracks, in FIG. 3, adjacent tracks may be partially overlap with each other. This will be explained in conjunction with FIG. 4. In FIG. 4, the same reference numerals as in FIG. 3 are used. In FIG. 4, like in FIG. 3, the images from the holograms on the i-th track to be read out are reproduced to the unit-information detectors in a channel which is different from the channel in which the images from the holograms on the (i±1) tracks are reproduced. Accordingly, even if the adjacent tracks are recorded in partially overlapped manner as shown, the crosstalk between the tracks does not occur provided that the diameter $r_2$ does not overlap the next but one track.

Figure 5:
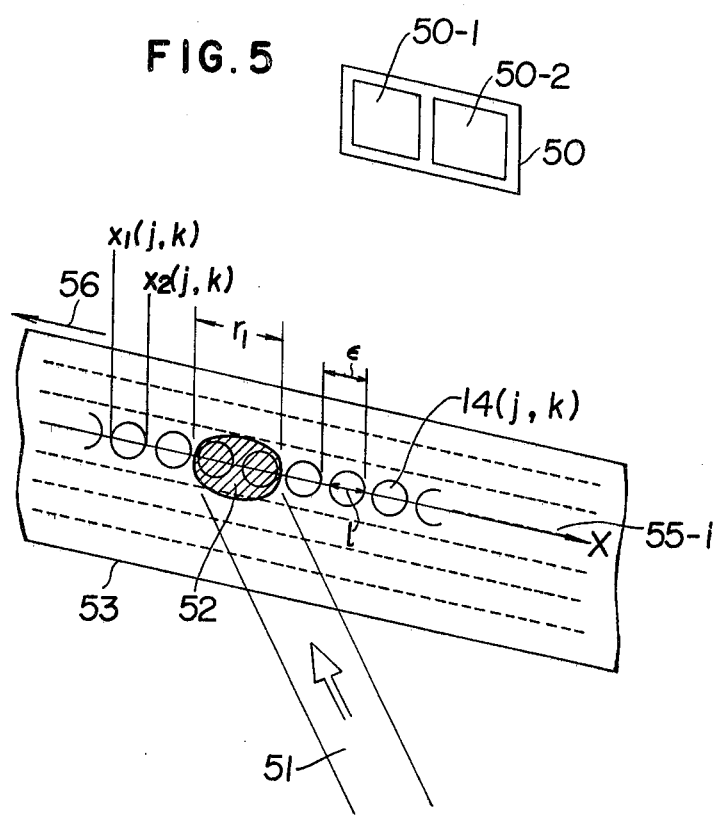
FIG. 5 shows an example of the hologram reproducing method of the present invention, in which the number of image positions $N = 2$.
Figure 6:
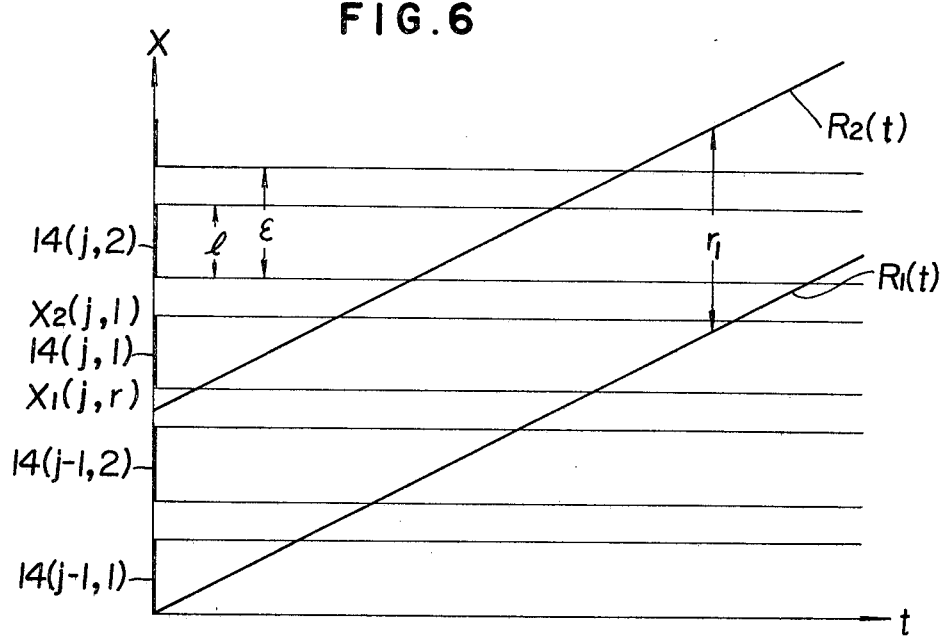
FIG. 6 shows a hologram scan chart corresponding to that shown in FIG. 5.

It has been described that the crosstalk between the tracks can be eliminated by the present invention. A method for reproducing information from the holograms in the same track is now explained. FIG. 5 shows a Fourier transform hologram reproducing optical system similar to FIG. 2, and it shows only major portions thereof for the above purpose. It comprises a photoelectric transducing apparatus 50, a reproducing light beam 51 a beam spot 52, a hologram tape 53, holograms 14 and tracks 55. The hologram tape 53 is continuously moving in the direction of the arrow 56 and the holograms on the i-th track 55-i are being relatively scanned in continuous manner by the reproducing light beam 51. The original information has been divided into a plurality of groups each consisting of two information units. In the photoelectric transducing apparatus 50, only one channel of unit-information detectors 50-1 and 50-2 are shown. It shows the channel of unit-information detectors which corresponds to the i-th track of holograms. Thus, when recording is effected by the two channel unit-information input apparatus as shown in FIG. 1 and reproduction is effected by the reproducing light beam having relatively large diameter $r_2$ as shown in FIG. 3 or 4, one may consider that only that channel of the two channel unit-information detectors of FIG. 2 which corresponds to the i-th track is shown in FIG. 5. Alternatively, one may consider that FIG. 5 shows the reproduction of the holograms along the i-th track when a unit-information input apparatus of one channel N-unit is used in the hologram recording optical system and a unit-information detecting apparatus of one channel is used in the reproducing optical system and the diameter $r_2$ of the reproducing light beam is selected not to overlap the next adjacent track. In FIG. 5, X-axis is assumed to extend over the i-th track and dimension of a hologram 14 (j, k) on the track along the X-axis is represented by l. Assuming that the holograms have been recorded in the range between $X_1(j, k)$ and $X_2(j, k)$ on the X-axis, then $X_2(j, k) - X_1(j, k) = 1$. Also assuming thet the hologram 14 (j, k) is next to the hologram 14 (j', k'), hologram-to-hologram separation ε may be defined by; $\epsilon = X_1(j', k') - X_1(j, k)$. The dimension of the reproducing light beam in the X-direction is $r_1$. FIG. 6 is a hologram scan chart showing a manner when the reproducing light beam 51 in FIG. 5 scans over the track 55-i. The time sequence changes in reproduced image intensity in the unit-information detectors 50-1 and 50-2 are shown by 7-1 and 7-2 in FIG. 7.

In FIG. 6, an abscissa represents a time and an ordinate represents the X-axis. When $X_1(1, 1) = 0$, and $N = 2$, then $$X_1(j, k) = (2j + k - 3)\epsilon \qquad (1)$$

$$X_2(j, k) = (2j + k - 3)\epsilon + l \qquad (2)$$

The trace of the reproducing light beam illumination area can be represented by an area encircled by;

$$R_1(t) = Ut \qquad (3)$$

$$R_2(t) = Ut + r_1 \qquad (4)$$

Where U is the moving velocity of the film. Therefore, the time at which the hologram 14 $(j, k)$ is reproduced can be derived from the equations (1) through (4). Assuming that the hologram 14 $(j, k)$ enters the reproducing light beam illumination area at time $t = t_1(j, k)$ and moves out of that area at time $t = t_2(j, k)$, then;

$$t_1(j, k) = (1/U)[(2j + k - 3)\epsilon - r_1] \qquad (5)$$

$$t_2(j, k) = (1/U)[(2j + k - 3)\epsilon + l] \qquad (6)$$

Figures 1, 7:
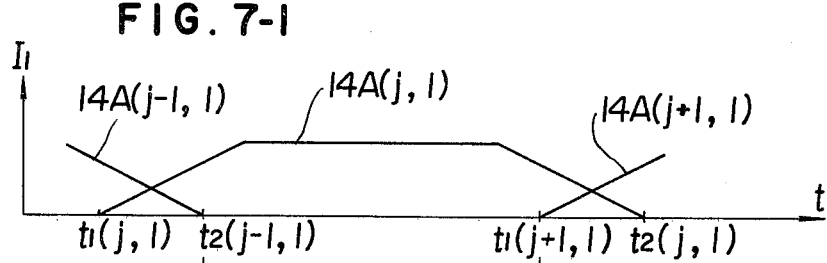
FIG. 7 shows a time sequence chart of a reproduced image intensity corresponding to FIG. 6.
Figures 2, 7:
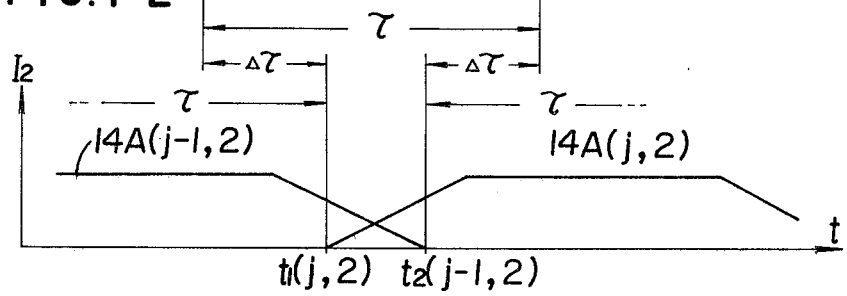

Irrespective of the value of $j$, all of the holograms 14 $(j, 1)$ which belong to the unit number 1 are sequentially reproduced on the unit-information detector 50-1 and all of the holograms 14 $(j, 2)$ which belong to the unit number 2 are sequentially reproduced on the unit-information detector 50-2, by the scan of the reproducing light beam. The changes, in time, of the reproduced image intensity on each of the unit-information detectors are shown in FIG. 7, in which an abscissa represents a time and an ordinate represents the reproduced image intensity, and 7-1 and 7-2 are time sequence charts of the reproduced image intensity on the unit-information detectors 50-1 and 50-2, respectively. In FIG. 7, the change in the intensity of the reproduced images from one hologram is shown schematically. 14A$(j, k)$ shows a reproduced image from the hologram 14$(j, k)$. As is apparent from FIG. 7, when $$t_1(j, k) < t_2(j-1, k)$$

crosstalk occurs between the reproduced images 14A$(j-1, k)$ and 14A$(j, k)$ during the period of $t_1(j, k)$ to $t_2(j-1, k)$, but if $$t_2(j-1, k) < t_1(j+1, k) \qquad (7)$$

is met, there always exists a period while the hologram 14$(j, k)$ is reproduced, that is, between the times $t_1(j, k)$ and $t_2(j, k)$, during which period no crosstalk occurs between the holograms 14$(j, k)$ and 14$(j-1, k)$ and between the holograms 14$(j, k)$ and 14$(j+1, k)$, respectively, that is, there always exists a period $\tau = t_1(j+1, k) - t_2(j-1, k)$ during which only the hologram 14$(j, k)$ is reproduced. Under the condition of the formula (7), if $$t_2(j-1, 1) < t_1(j, 2) \qquad (8)$$

is met, a crosstalk free reproduced image of the hologram 14$(j, 1)$ and a crosstalk free reproduced image of the hologram 14$(j-1, 2)$ are reproduced on different unit information detectors simultaneously for a period $(\Delta \tau)$ from $t_2(j-1, 1)$ to $t_1(j, 2)$. The condition which meets the formulas (7) and (8) is;

$$2\epsilon - l < r_1 < 3\epsilon - l \qquad (9)$$

If $$t_2(j-1, k) < t_1(j, k)$$

is met, no crosstalk occurs between the reproduced images 14A$(j-1, k)$ and 14A$(j, k)$. Accordingly, if $$t_1(j, 1) < t_2(j-1, 2)$$

is met, the holograms 14$(j-1, 2)$ and 14$(j, 1)$ are reproduced simultaneously on the unit-information detectors 50-2 and 50-1, respectively, for the period $\Delta \tau = t_2(j-1, 2) - t_1(j, 1)$ without any crosstalk therebetween. The condition therefor is;

$$\epsilon - l < r_1 < 2\epsilon - l \qquad (10)$$

From the formulas (9) and (10), it is derived that;

$$\epsilon - l < r_1 < 3\epsilon - l \qquad (11)$$

Thus, in FIG. 5, if the scan is effected by the reproducing light beam having the beam diameter $r_1$ as defined by the formula (11), the reproduced images from adjacent holograms in the same track can be reproduced without any optical crosstalk therebetween while assuring the period $(\Delta \tau > 0)$ during which the reproduced images from the adjacent holograms simultaneously appear on different unit-information detectors. Thus, by switching the output circuits of the two unit-information detectors on which the images are coincidently reproduced, during said period $(\Delta \tau)$, the information from the adjacent holograms can be continuously reproduced in time sequence. FIG. 8 shows a timing chart therefor with correspondence to FIG. 7. In FIG. 8, 8-1 and 8-2 emphasize those portions 14B$(j, k)$ of the reproduced image intensity changes 14A$(j, k)$ in 7-1 and 7-2 of FIG. 7 in which no crosstalk occurs. In 8-1 and 8-2, an abscissa shows a time and an ordinate shows the reproduced image intensity. 8-3 shows the flow of information alternately derived from two unit-information detectors. 14C$(j, k)$ represents information photoelectrically converted from the crosstalk free reproduced image 14B$(j, k)$. In observing FIG. 8, it should be noted that in 8-1 and 8-2 the reproduced images 14B$(j, k)$ appear on an image plane only for the period $\tau$ and they are stationary but in 8-3 the reproduced information 14C$(j, k)$ are signals derived by electronically scanning the reproduced images 14B$(j, k)$. For example, when the reproduced images 14B$(j, k)$ are in the form of a 9-row by 10-column bit pattern and the detectors 50-1 and 50-2 each consist of a 9-row by 10-column photo-diode array and the nine channels are electronically scanned in parallel in photo-electrically converting the reproduced images, then 14C$(j, k)$ represents nine channels of time sequential outputs with each channel comprising ten bits.

Figures 4, 9:
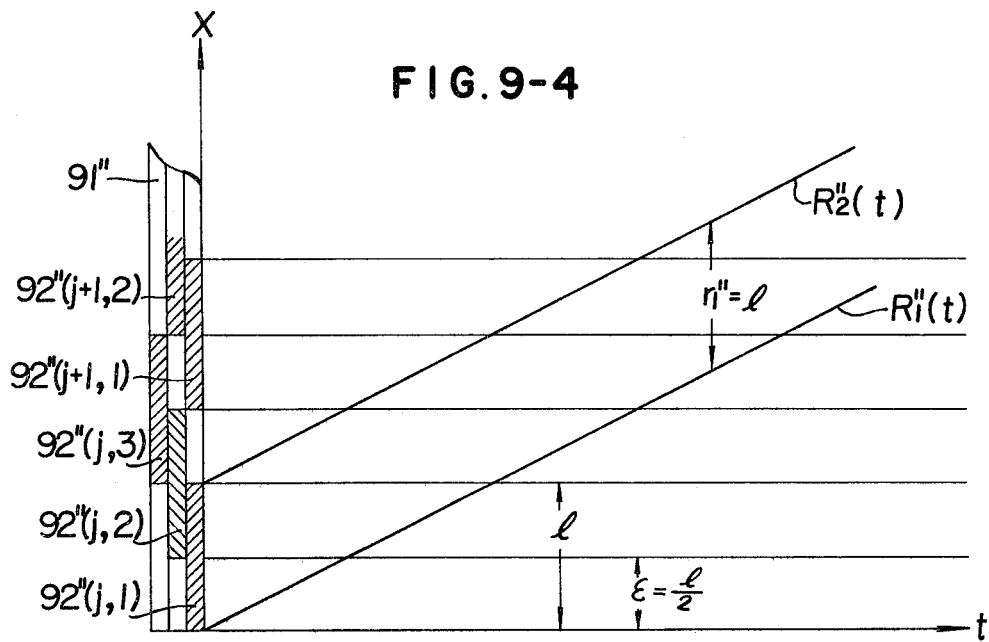
FIG. 9 shows a hologram scan chart in one example of the hologram reproducing method of the present invention, in which $N = 3$, and a time sequence chart of the reproduced image intensity.
Figures 5, 9:
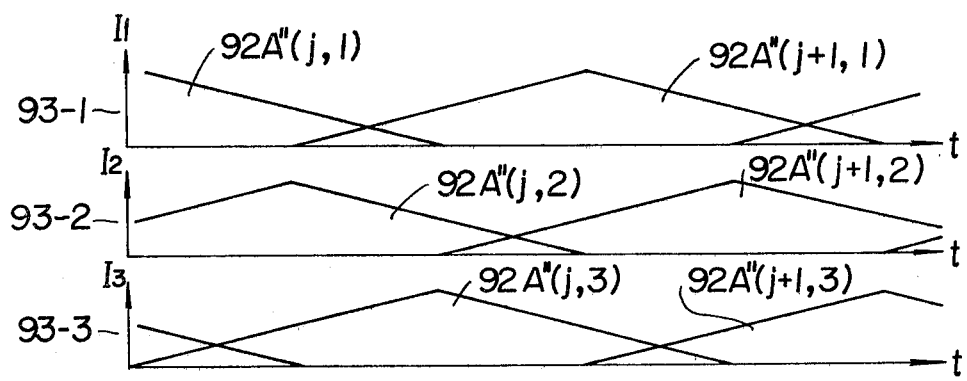

In the examples shown in FIGS. 5 through 8, one information group consisted of two information units or $N = 2$, and there existed gaps between adjacent holograms or $\epsilon > l$. It should be understood that N may be equal to or larger than 2, and $\epsilon$ may be $0 < \epsilon \leq l$. That is, when N, $l$ and $\epsilon$ are selected in implementing the reproducing method of the present invention, the diameter $r_1$ of the reproducing light beam in the direction of the scan may be selected in the range of:

$$L(\epsilon-l, 0) < r_1 < (2N-1)\epsilon - l \qquad (12)$$

where $L(\epsilon-l, 0)$ represents $\epsilon-l$ or 0, whichever larger. As an example, an application where N = 3 is explained below. FIG. 9-1 shows a hologram scan chart similar to FIG. 6. In FIG. 9, the abscissa represents time and the ordinate represents an X-axis drawn along the track on the hologram tape. Numeral 91 represents a sectional area taken along the X-axis of the hologram tape. 92(j, k) represents a hologram on which the k-th unit-information of the j-th group are recorded. In FIG. 9-1, hologram-to-hologram separation $\epsilon$ is equal to the size $l$ of the hologram in the direction of the track. Thus, there is no gap between adjacent holograms. In this case, from the formula (12) the diameter $r_1$ of the reproducing light beam is defined by $0<r_1<4l$. The area encircled by $R_1(t)$ and $R_2(t)$ represents a trace of the reproducing light beam when $r_1=l$ and the area encircled by $R_1(t)$ and $R'_2(t)$ represents a trace of the reproducing light beam when $r'_1 = 2l$.

FIGS. 9-2 and 9-3 show the reproduced image intensity time sequence charts corresponding to FIG. 7 when $r_1=l$ and $r'_1=2l$, respectively. Since it is assumed that $N=3$, three unit-information detectors are arranged on an image plane of the reproducing optical system. 93-1 through 93-3 show the changes, in time, of the reproduced image intensity at each of the detectors. An abscissa represents a time and an ordinate represents the intensity. As stated before, irrespective of the value of $j$, the reproduced images 92A (j, k) from the hologram 92(j, k) appears on the k-th unit-information detector. Therefore, if $r_1=l$, FIG. 9-2 is derived in correspondence to FIG. 9-1, and if $r'_1=2l$, FIG. 9-3 is derived.

The holograms may be recorded in partially overlapped manner. This is illustrated in FIG. 9-4, in which 91" is a sectional area of the hologram tape and 92"(j, k) is the hologram (in section). In FIG. 9-4, the holograms 92"(j, 1) and 92"(j, 2) are shown as if they had been recorded at spatially different locations in the tape sectional area, but it should be understood that in actual they are recorded in paritally overlapped manner. The drawing is schematically shown in order to facilitate the observation of a range along the X-axis within which the holograms are recorded. In FIG. 9-4, since $\epsilon = (1/2)l$, a relation of $(1/2)l < r_1 < (3/2)l$ is derived from the formula (12). In FIG. 9-4, a trace of the reproducing light beam when $r_1''=l$ is shown as an example. Corresponding time sequence chart of the reproduced image intensity is shown in FIG. 9-5. In FIGS. 9-2, 9-3 and 9-5, the time sequences for the reproduction of the images from the holograms are different, but in any event, the reproduced images which are free from crosstalk between the adjacent holograms can be reproduced in the time sequence which assures the existence of a period in which the images from the adjacent holograms are reproduced simultaneously on the different unit-information detectors.

While an example of the method of hologram recording for allowing reproduction of holograms in accordance with the present invention has been described in conjunction with FIG. 1 where a plurality of unit-information input positions are arranged, of which the number is equal to that of separate image positions, other recording methods may be used. Since separation of image positions of adjacent holograms can also be attained through the shift function of Fourier transform holography, it is possible to record said holograms by combinations of unit-information input positions which are fewer in number than image positions and a plurality (M) of reference light beams. The numbers of unit-information input positions and reference light beams can be determined such that all possible one-to-one combinations amount to the number of separate image positions. Therefore, M(larger than one, and less than or equal to the number of separate imaging positions, N or 2N) reference light beams are needed for a Fourier transform hologram recording optical system installed with N/M or 2N/M(equal to or larger than one, and less than N or 2N) unit-information input position or positions.

For example, if a Fourier transform hologram recording optical system is equipped with a single unit-information input device and a plurality of reference light beams, the number of which is equal to that of separate image positions, holograms are recorded by using said input device and said reference light beams one by one. This example will be described in details later with reference to a drawing. As another example, a plurality of unit-information input positions and a plurality of reference light beams of different incident angles are provided in a Fourier transform hologram recording optical system, a first hologram is recorded by using a first one of the unit-information input positions and a first reference light beam, and a second hologram adjacent to the first hologram is recorded by using said first unit-information input position and a second reference light beam or by using a second unit-information input position and the first or a second reference light beam.

Mathematically speaking, the combination of a single reference light beam and N or 2N unit-information input positions may be considered as the case of M equal to one (1) in the foregoing description, but in this case it should be noted that the shift function of the Fourier transform holography is not utilized to separate image positions of adjacent holograms. Therefore, said case is physically different, and has been described as a different method of recording with reference to FIG. 1.

Figures 1, 11:
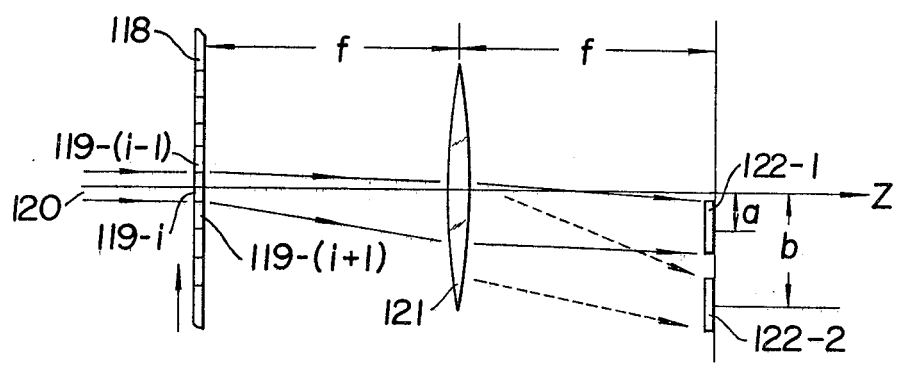
FIG. 11 shows reproducing light and the image positions in reproducing the hologram recorded by the method of FIG. 10.
Figures 2, 11:
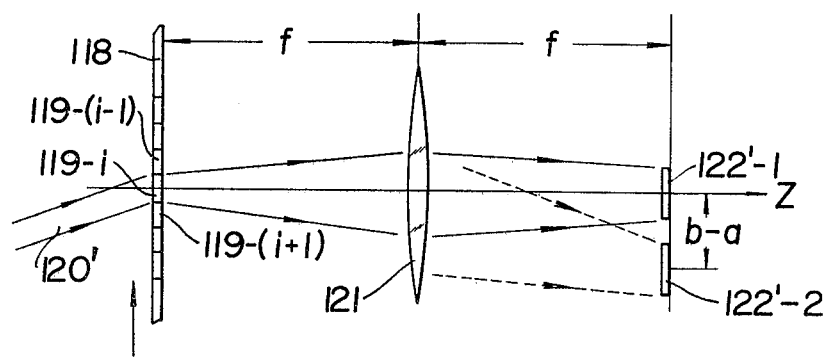

Now, one method of recording holograms with unit-information input devices fewer in number than the image positions is explained with reference to FIG. 10. Here, for the purpose of simplification, the original information is divided into a number of groups each consisting of two information units (N=2), and is recorded on a record medium in the form of tape through a single unit-information input position (N/M) by use of two reference light beams (M=2). FIG. 10 shows an example of the Fourier transform hologram recording system for implementing the present invention. It comprises a laser device 101, a shutter 102, a beam splitter 103, beam expanders 104 and 105, stationary mirrors 106, 107 and 108, a movable mirror 109, a unit-information input device 116 having a single input position, a Fourier transform lens 117, a record medium 118, and a hologram 119, Z being an optical axis. The laser beam 110 issued from the laser device 101 is split by the beam splitter 103 into laser beams 111 and 112. The laser beam 111 is expanded by the beam expander 104 and modulated by information applied to the unit-information input device 116 to generate an object beam 113 which is Fourier transformed by the lens 117 and impinges onto the record medium 118 which is located in the Fourierr transform plane. On the other hand, the laser beam 112 is expanded by the beam expander 105 to an appropriate size, reflected by the stationary mirror 106 and impinges onto the movable mirror 109 to produce a plane wave reference beam 114 represented by $\exp(-2\pi i \xi a)$ (reference letters are shown in FIGS. 10 and 11) or a plane wave reference beam 115 represented by $\exp(-2\pi i \xi b)$ depending on the rotation angle of the movable mirror 109, for interfering with said object beam 113 on the record medium 118. By exposing the interference pattern for an appropriate time through the shutter 102, the hologram 119 is recorded. In practising the present invention, the hologram may be recorded in the following manner: First, the information D(1, 1) of the first group, first unit is applied to the unit-information input device 116, the movable mirror 109 is directed toward the mirror 107, the hologram 119-1 is recorded using the reference beam 114, and the recorded medium 118 is moved by the size of the hologram in the direction of the arrow. Next, the information D(1, 2) of the first group, second unit is applied to the unit-information input device 116, the movable mirror 109 is directed toward the mirror 108, and the hologram 119-2 is recorded using the reference beam 115. In a similar way, holograms are recorded using the reference beam 114 for the first unit-information D(j, 1) (j = 1, 2, 3 . . . ) and using the reference beam 115 for the second unit-information D(j, 2), irrespective of the group number.

The holograms thus recorded may be reproduced by the method of the present invention explained in connection with FIGS. 5 to 8. Here, only the separation of the image positions of the holograms is explained with reference to the drawings. FIGS. 11-1 and 11-2 show the reproducing optical systems for the holograms recorded in FIG. 10, in which FIG. 11-1 shows a case where the reproducing light beam 120 impinges perpendicularly to the hologram along the optical axis (Z-axis), and FIG. 11-2 shows a case where the reproducing light beam 120' impinges at the same incident angle as the reference beam 114, i.e. a plane wave reference beam $\exp(-2\pi i \xi a)$, in FIG. 10. In FIG. 11-1, 121 is an inverse Fourier transform lens having a focal distance of $f$, and 118 is the record medium 118 in FIG. 10 having a number of holograms 119 recorded thereon and developed. When the holograms are reproduced by the illustrated optical system, images are reproduced on the position 122-1 from the odd-numbered holograms 119-2n-1 (n=1, 2, 3 . . .) on which the first unit-information D(j, 1) have been recorded, and on the position 122-2 from the even-numbered holograms 119-2n on which the second unit-information D(j, 2) have been recorded. This is due to the shift function of the Fourier transform holography as will be understood by those skilled in the art of holography. In FIG. 11-1, a and b represent distances between the centers of the image positions 122-1 and 122-2, respectively, and the optical axis, and they correspond to a and b expressed in the phase components $\exp(-2\pi i \xi a)$ and $\exp(-2\pi i \xi b)$ of the reference beam in hologram recording explained in FIG. 10.

In FIG. 11-2, 120' is the reproducing light beam, 122'-1 and 122'-2 are image positions, and other reference numerals represent the same elements as in FIG. 11-1. The reproducing light beam 120' is the plane wave $\exp(-2\pi i \xi a)$ which impinges at the same incident angle as the reference beam 114 in FIG. 10. By using the reproducing light beam 120', images are reproduced at the position 122'-1 from the odd-numbered holograms 119-2n-1, that is, at the position corresponding to the position at which the input information have been applied in recording the hologram, and the images are reproduced at the position 122'-2 which is displaced by b-a from the optical axis, from the even-numbered holograms 119-2n.

Accordingly, in FIG. 11-1 or 11-2, if the magnitude b-a is selected to assure that the images do not overlap with each other, there is no crosstalk between the images reproduced at the position 122-1 (or 122'-1) and the images reproduced at 122-2 (or 122'-2). In FIGS. 11-1 and 11-2, in order to facilitate the understanding, the examples in which the reproducing light beam impinges perpendicularly to the hologram and it impinges at the same incident angle as one of the two reference beams, respectively. However, the incident angle of the reproducing light need not be limited to the above examples but any other angle may be used.

Having described the construction of the present invention and functions thereof, particular embodiments of the present invention are now explained in connection with the drawings.

Figures 1, 12:
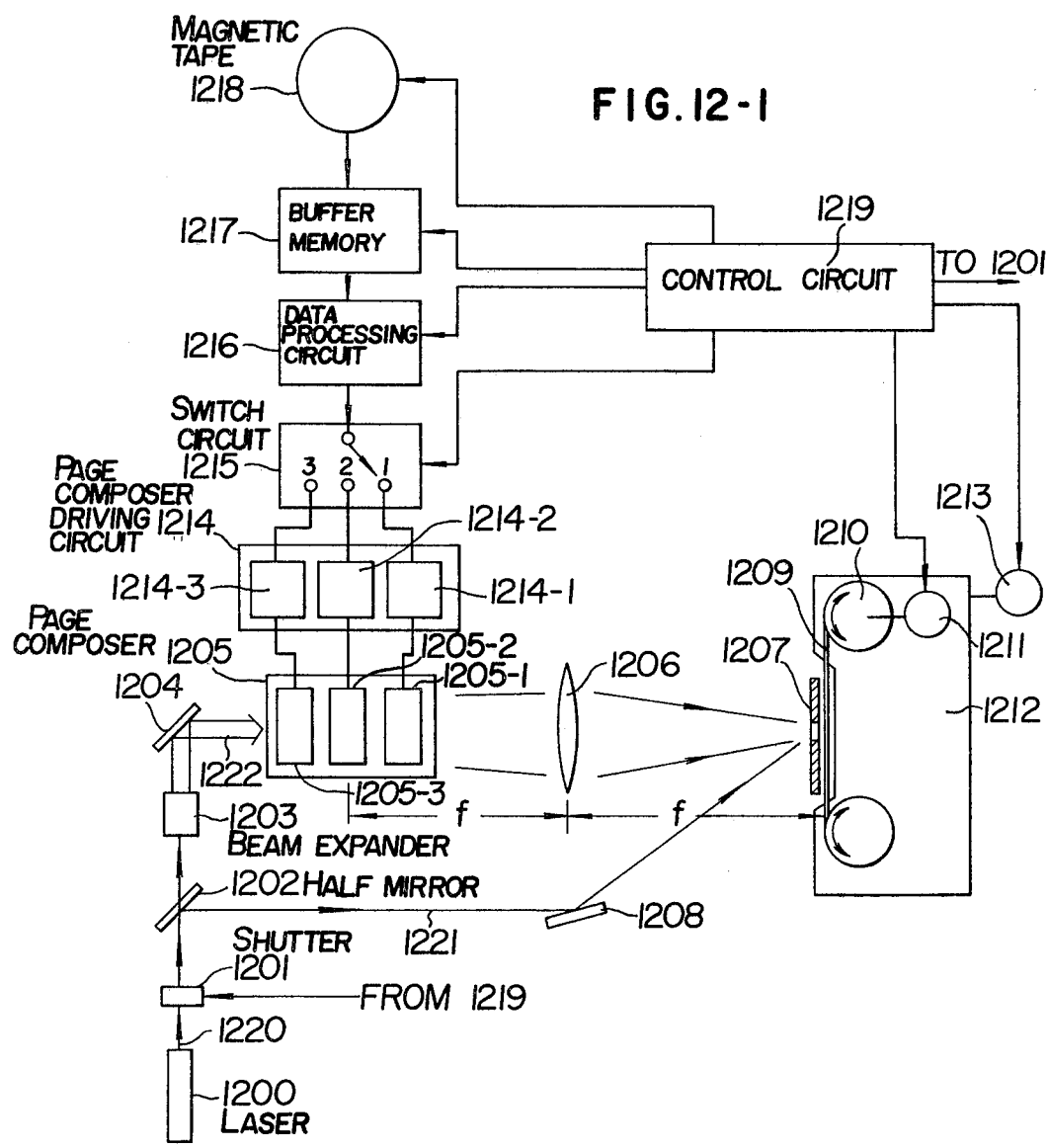
FIG. 12 shows an embodiment of a Fourier transform hologram recording system according to the present invention.
Figures 3, 12:
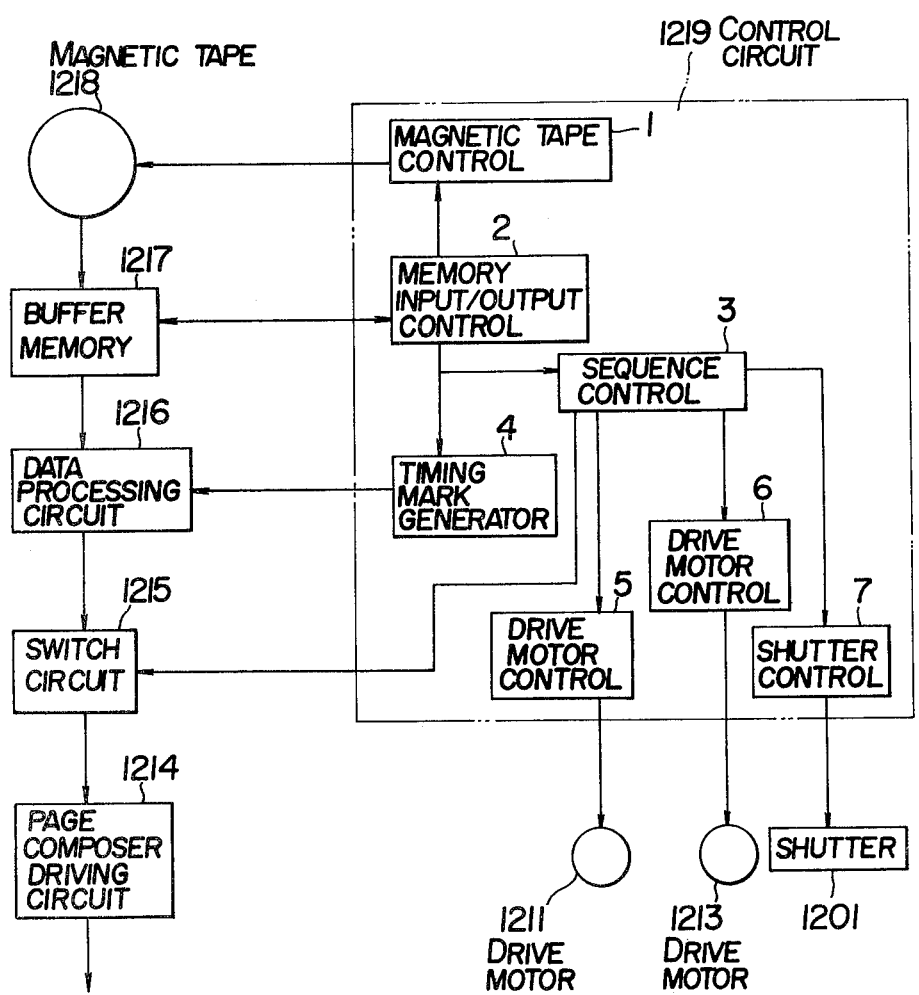

FIG. 12 shows another embodiment of the hologram recording system of the present invention in which a plurality of unit-information input positions, i.e. N=3, and a single reference light beam, are used. It is assumed here that the original information is digital instead of analog. Bit information is recorded on a magnetic tape 1218, one information unit consists of 300 bits including bit information for timing mark, and three information units constitute one information group (N=3). Holograms are recorded on a 35 mm film 1209 to form tracks longitudinally. Size of a hologram in the direction of track is $l$, and hologram-to-hologram separation is $\epsilon = l$ (that is, adjacent holograms are in contact), and the holograms are arranged to leave a gap between adjacent tracks. An information input apparatus 1205 comprises a 30 × 30 two-dimension shutter matrix. The hologram recording apparatus shown in FIG. 12-1 includes an optical system, a film drive mechanism, an information handling circuit and a control circuit. The optical system comprises a laser 1200, a shutter 1201, a half-mirror 1202, a beam expander 1203, total reflection mirrors 1204 and 1208, a page composer 1205, a Fourier transform lens 1206 and an aperture 1207. By adjusting an opening of the aperture 1207, the size $l$ of the hologram can be varied. The film drive mechanism comprises the 35 mm film 1209, a reel 1210, a reel drive motor 1211, a film stage 1212 and a film stage drive motor 1213. The information handling circuit comprises a page composer driving circuit 1214, a switch circuit 1215, a data processing circuit 1216, a buffer memory 1217 and the magnetic tape 1218. The control circuit 1219 functions to operate the optical system, the film drive mechanism and the information handling circuit based on a predetermined program. A focal distance of the lens 1206 is $f$, and the page composer 1205 is disposed on a front focal plane and the 35 mm film 1209 is disposed on a rear focal plane. One example of spatial arrangement of the page composer 1205 is shown in FIG. 12-2. Assuming that an optical axis of the Fourier transform optical system is on Z-axis and the front focal plane of the lens 1206 is on X-Y plane, the page composer 1205 is divided into three sections along the X-axis as shown to form the unit-information input devices 1205-1 to 1205-3. The reference beam 1221 is in Y-Z plane. The laser beam 1220 is expanded by the beam expander 1203 into a laser beam 1222 of a diameter which allows the illumination of the entire page composer 1205. The page composer 1205 is constructed to transmit no light when no information is applied thereto or when "0" bit information is applied thereto. The holograms are recorded in the following manner using the above recording apparatus. The shutter 1201 has previously been closed. An appropriate amount of information is stored into the buffer memory 1217 from the magnetic tape 1218. The first 297 bits are read out of the memory by the data processing circuit 1216, and three bit are added thereto as timing marks to form a first 300-bit unit-information D(1, 1). The connection of the switch circuit 1215 is set to an "1" position to actuate the page composer driving circuit 1214-1 for applying the first unit-information D(1, 1) to the unit-information input device 1205-1 as a spatial pattern. The shutter 1201 is opened for a predetermined time to record the spatial pattern onto the 35 mm film 1209 as a Fourier transform hologram. The reel 1210 is driven by the motor 1211 to wind the film 1209 by $\epsilon = l$. Subsequently, the first group, second unit-information D(1, 2) of 300 bits are formed by the data processing circuit 1216, and the switch circuit 1215 is set to a "2" position to apply the above information to the unit-information input device 1205-2 for recording a hologram in the same manner as before. In a similar way, the j-th group, k-th unit-information D(j, k) of 300 bits are formed by the data processing circuit 1216, and the switch circuit 1215 is set to a "k" position to apply the information to the unit-information input device 1205-k for recording the holograms. Each time the holograms of the size $l$ has been recorded, the film is wound by $\epsilon = l$. When the first track on the film 1209 has been recorded, the film is rewound completely. The motor 1213 is energized to raise the film stage 1212 by a given distance (while the aperture 1207 is kept stationary) so that the second track of the holograms can be recorded on the film 1209. By the same procedure as described above, the holograms are recorded on the sound track. In a similar way, the two-dimension bit information applied from three different devices are holographycally recorded in a plurality of tracks on the film 1209. The configuration of the unit-information input devices is not limited to that shown in FIG. 12-2. For example, the first unit-information input device may consist of 10 rows (1st, 4th, . . . 28th rows) by 30 columns, the second unit-information input device may consist of 10 rows (2nd, 5th, . . . 29th rows) by 30 columns, and the third unit-information input device may consist of 10 rows (remaining 10 rows) by 30 columns. In essence, it is sufficient that the unit-information input positions are substantially spatially separated from each other.

An example of the control circuit 1219 is shown in FIG. 12-3. In response to a command from a magnetic tape control 1, the magnetic tape 1218 is driven and information is transferred to the buffer memory 1217. The amount of information transferred is counted by a memory input/output control 2. When the amount reaches a predetermined quantity the memory input/output control 2 operates the magnetic control 1 to stop the magnetic tape 1218, and then renders the buffer memory 1217 supply information corresponding to the amount of one unit-information to the data processing circuit 1216 and at the same time the memory input/output control 2 provides a sequence control 3 and a timing mark generator 4 with the group number and the unit number of the information. The timing mark generator 4 in response to the group number and the unit number supplied thereto, delivers a timing bit information to the data processing circuit 1216. The data processing circuit 1216 arranges the information supplied from the buffer memory 1217 and the timing mark generator 4 in the form of a bit arrangement which is adapted as an input to the page composer 1205. The sequence control 3, in accordance with the group number and the unit number supplied by the memory input/output control 2, delivers output signals to the switch circuit 1215, a drive motor control 5, another dive motor control 6 and a shutter control 7, in order to achieve associated operations of the switch circuit 1215, the reel drive motor 1211, the film stage drive motor 1213 and the shutter 1201 in a predetermined time sequence as described hereinbefore.

One embodiment of the reproducing system of the present invention for reproducing the holograms recorded in the manner described above is shown in FIG. 13. It comprises a laser device 1300, a beam deflector 1301, a hologram tape 1302, an inverse Fourier transform lens 1305 and a photoelectric transducer device 1306. The hologram tape 1302 is the 35 mm film shown in FIG. 12-1 on which the holograms have been recorded and subjected to developing and fixing process. The photoelectric transducer device 1306 includes a 30 × 30 photodiode array disposed on the image plane, which is divided into unit-information detectors 1306-1 to 1306-3 each consisting of a 10 × 30 photodiode sub-array, in correspondence to the reproducing image positions from the respective holograms. The beam deflector 1320 functions to shift the reproducing light beam 1320 in parallel to correspond to a particular track on the hologram tape 1302 to be read out. A reel 1303 on which the tape 1302 is wound or from which the tape is rewound, and a motor 1304 for driving the reel are provided. Also provided are a timing mark detector 1307, a switching circuit 1308, an amplifier 1309, a signal output terminal 1310 and a control circuit 1311 for controlling the tape travel speed, timing mark detection and the operation of the switching circuit either synchronously or asynchronously. The diameter $r_1$ of the reproducing light beam 1320 need only be within the range defined by the formula (12). Here, it is assumed that $r_1 = 2l$. Thus, as the hologram tape 1302 moves, a sequence of reproduced images shown in FIG. 9-3 appear on the three unit-information detectors 1306-1 to 1306-3. The timing marks from the respective holograms are detected by the timing mark detector 1307 and the switching circuit 1308 is operated in synchronism thereto for producing information free from optical crosstalk from the respective unit-information detectors in the form of electrical signal. The movement of the hologram tape and the information readout from the detector need not be synchronized but they may be asynchronous. Where the original information is PCM coded audio signal, for example, a buffer memory following the output terminal 1310 is not necessary if the tape travel speed and the information readout are synchronized. In order to maintain a constant tape travel velocity, the motor 1304 may be servo-controlled by the control circuit 1311. The variation in speed within control range appears as the variation in time period ($\Delta \tau$ in FIG. 7) during which the reproduced images which are free from optical crosstalk from the adjacent holograms are reproduced simultaneously on the different detectors. Thus, by servo-controlling the tape travel speed within a range which assures a positive $\Delta \tau$, a fixed time period during which one unit-information is reproduced from each of the unit-information detectors by the electronic scan of the photodiode array can be constantly assured so that synchronized information reproduction as shown by 8-3 in FIG. 8 is realized. It should be understood that the information reproduction from the unit-information detectors consisting of the two-dimensional photodiode array may be effected either in bit serial manner or in byte serial manner.

Figure 13:
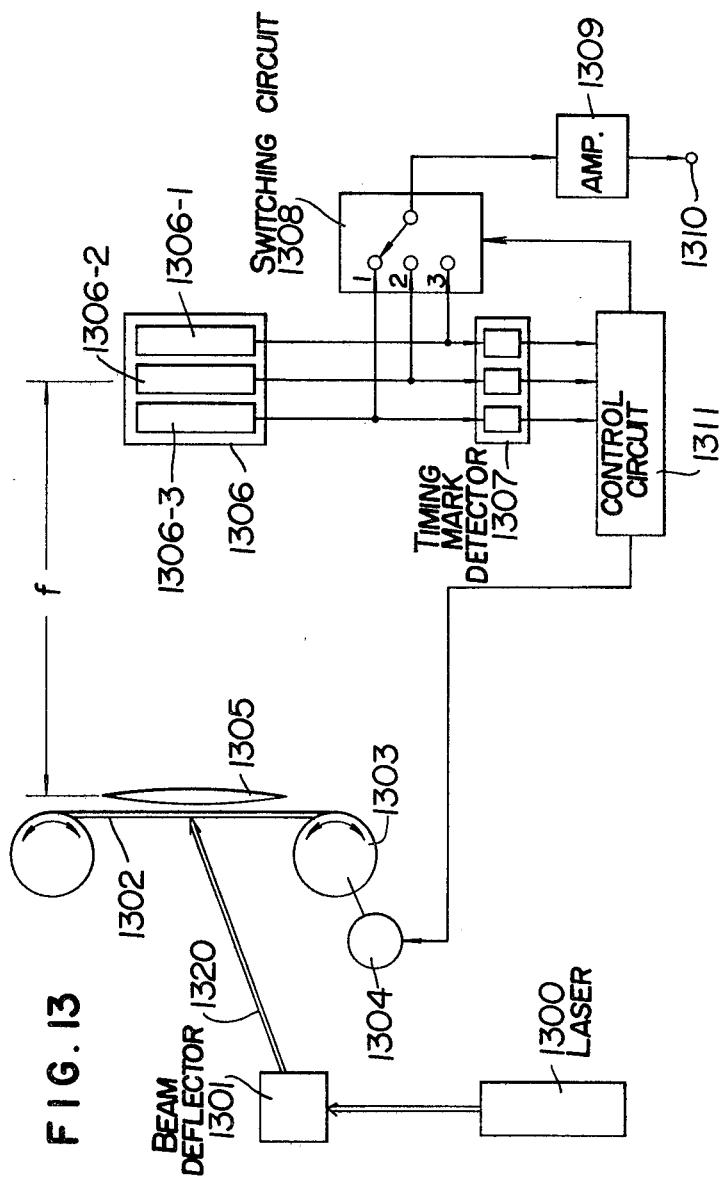
FIG. 13 shows an embodiment of a reproducing system of the present invention for the hologram recorded by the system of FIG. 12, in which the number of the image positions $N = 3$, and one channel is used.
Figure 14:
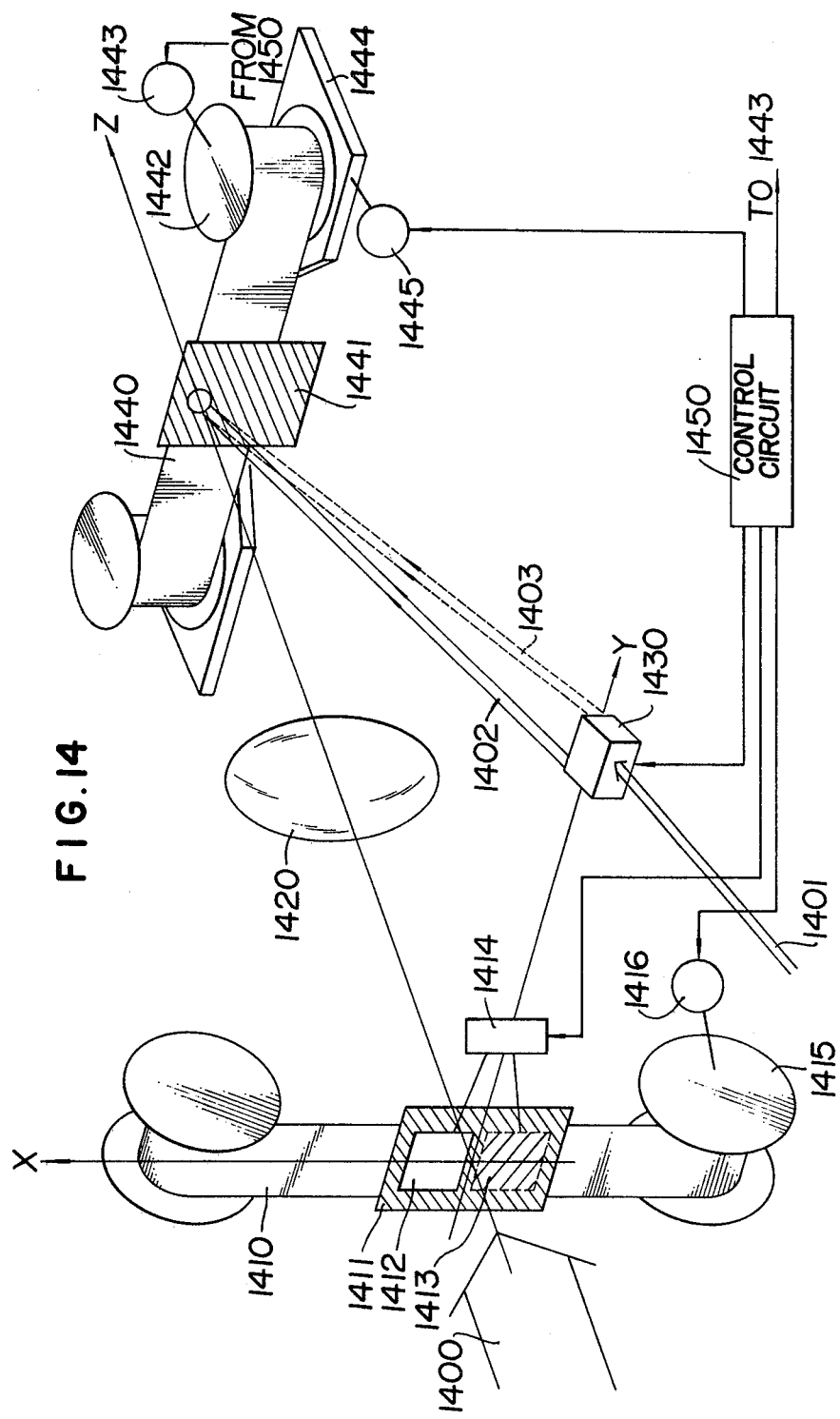
FIG. 14 shows another embodiment of the recording system different from FIG. 12.
Figure 15:
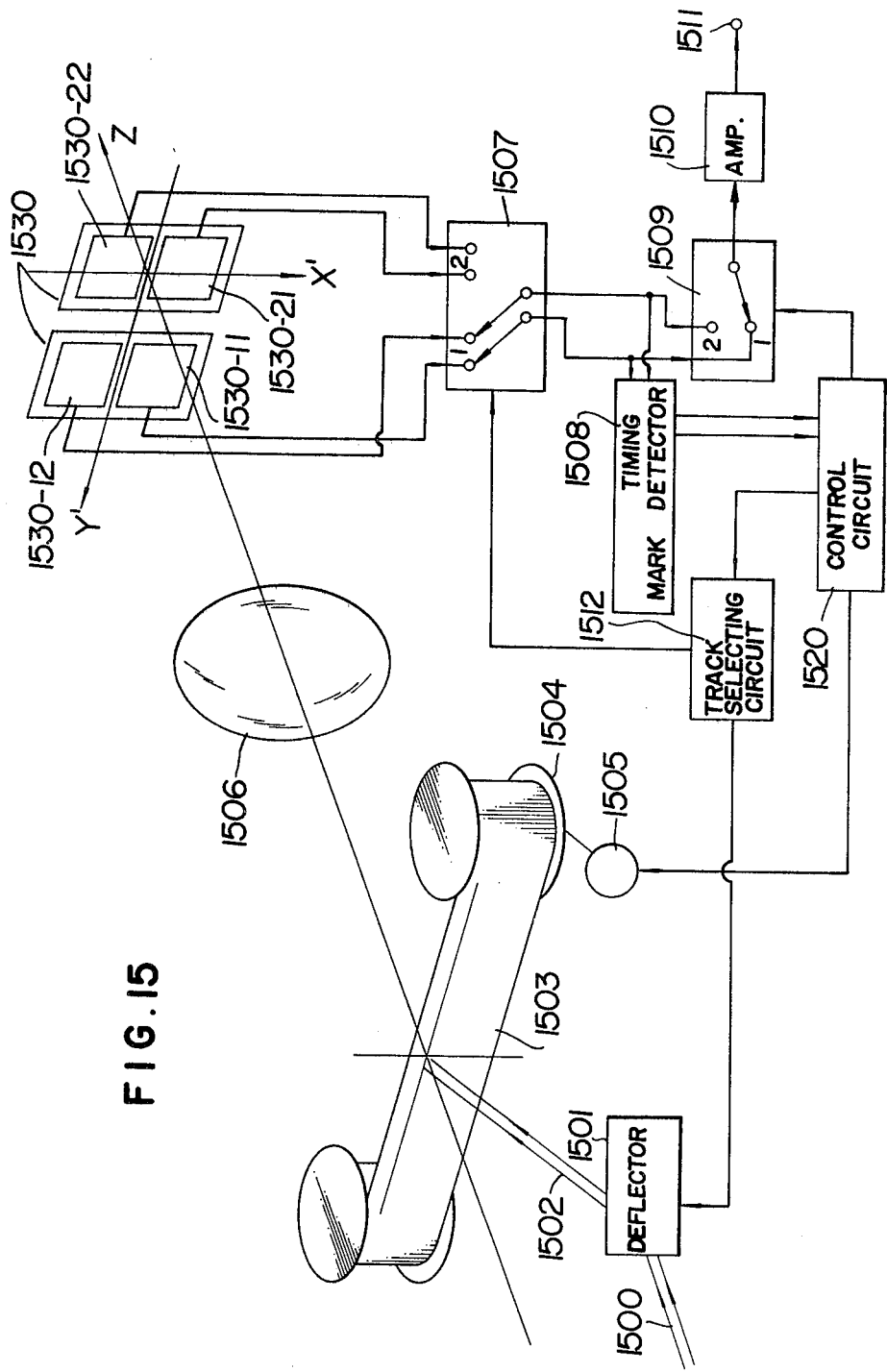
FIG. 15 shows an embodiment of the reproducing system of the present invention for reproducing the hologram recorded by the system of FIG. 14, in which the number of the image positions per channel $N = 2$, and two channels are used.

While FIG. 13 shows the case where the reproducing light illumination area does not overlap the adjacent tracks, a hologram reproducing optical system which permits the overlap of the reproducing light illumination area with the adjacent tracks as shown in FIG. 3 or 4 is shown in FIG. 15 and a hologram recording optical system therefor is shown in FIG. 14. Here, it is assumed that two information units ($N=2$) constitute one information group and two unit-information positions ($2N/M=2$) using two reference light beams ($M=2$). The recording is effected by a similar method as explained in connection with FIG. 10. FIG. 14 shows a Fourier transform hologram recording optical system which includes a Fourier transform lens 1420. An 8-mm film 1410 having the original information recorded is disposed on a front focal plane (X-Y plane) of the lens and a 35-mm film 1440 for recording holograms thereon is disposed on a rear focal plane. Laser beams 1400 and 1401 are generated by the same laser device not shown. An aperture 1411 has two openings 1412 and 1413. The size of the respective opening is equal to the size of one frame of the 8-mm film and the openings are arranged to correspond to the positions of two contiguous frames. An aperture open/close device 1414 opens or closes the openings 1412 and 1413 in response to a command from a control circuit 1450. One unit-information is recorded on each frame of the 8-mm film 1410. The original information may be either bit information or analog information such as animation. A reel 1415 is driven by a motor 1416. A stationary aperture 1441 is also provided. A reel 1442 and a drive motor 1443 are mounted on a stage 1444 which can be moved up and down by a motor 1445. A deflector 1430 and reference light beams 1402 and 1403 which lie in Y-Z plane are shown. A control circuit 1450 functions to operate the respective sections of the system sequentially. Assuming that the first unit-information in each information group are recorded on the odd-numbered frames of the 8-mm film and second unit-information are recorded on the even-numbered frames, when an odd-numbered frame is registered with the opening 1412, an even-numbered frame is at the position of the opening 1413. When a first track is to be recorded on the 35-mm film 1440, the reference beam 1402 is used. Namely, the first frame of the 8-mm film is registered with the opening 1412, and the opening 1412 is opened while the opening 1413 is closed. Using the reference beam 1402, a hologram is recorded and then the 35-mm film 1440 is wound by a fixed amount. Then, the opening 1412 is closed and the opening 1413 is opened, and using the same reference beam 1402 a second hologram is recorded on the second frame and the 35-mm film is wound by the fixed amount.

After the first two frames, or one information group have been hologram recorded, the 8-mm film 1410 is wound by the amount of two frames. In a similar way, the first unit-information of each of the groups are applied through the opening 1412 and the second unit-information are applied through the opening 1413 while using the reference beam 1402 to record the holograms on the odd-numbered track on the 35-mm film and using the reference beam 1403 to record the holograms on the even-numbered track. A reproducing optical system for reproducing the holograms thus recorded is shown in FIG. 15.

In FIG. 15, there are shown a laser beam 1500, a deflector 1501, a reproducing light beam 1502 which impinges onto a hologram tape 1503 at the same incident angle as the beam 1403 in FIG. 14, a hologram tape 1503 which is the film 1440 in FIG. 14 having been subjected to developing process, a reel 1504, a drive motor 1505, and an inverse Fourier transform lens 1506. The hologram tape 1503 travels on a front focal plane of the lens and a photoelectric transducer apparatus 1530 is disposed on a rear focal plane (X'—Y' plane). Further provided are a channel selection circuit 1507, a timing mark detector 1508, a switching circuit 1509, an amplifier circuit 1510, an output terminal 1511, a track selecting circuit 1512 and a control circuit 1520. The photoelectric transducer apparatus 1530 comprises two channels of four unit-information detectors, each channel including two unit-information detectors 1530-11, -12 and 1530-21 and -22, respectively. The unit-information detectors may be any appropriate detectors such as image pickup tubes or photodiode arrays depending on the types of images to be read. The deflector 1501 functions to shift the reproducing beam 1502 in parallel in response to a command from the track selecting circuit 1512 so as to illuminate a desired track. The incident angle of the reproducing light beam is constant. It is only needed that the diameter $r_1$ of the reproducing light beam 1502 in the direction of the track is within the range defined by the formula (12) and the diameter $r_2$ transverse thereto does not overlap the next but one track. Since the incident angle of the reproducing light beam is the same as that of the reference beam 1403 in FIG. 14, the images are reproduced on the first channel of unit-information detectors 1530-11 and -12 from the odd-numbered tracks on the hologram tape 1503, and the images are reproduced on the second channel of the unit-information detectors 1530-21 and -22 from the even-numbered tracks. Thus, when a track is selected by the track selection circuit 1512, the channel is also switched by the channel selection circuit 1507. The method for reading out information from the holograms in one track is the same as that explained with reference to FIG. 13.

What is claimed is:

1. A method for recording information as Fourrier transform holograms which, in reproducing, are read out by relative, continuous scan with a reproducing light beam, comprising the steps of;

preparing information in a form adapted to be recorded as holograms by dividing the original information to be recorded into a number of information groups each consisting of a predetermined number, N, of unit-informations each consisting of a given amount of information, said predetermined number N being at least two, supplying the prepared information to an information input device having a single or a plurality of unit-information input positions beginning from a first unit-information of a first group sequentially, said plurality of unit-information input positions being arranged on an information input surface without substantially overlapping one another, exposing each unit-information supplied to said unit-information input position to an object light beam to effect modulation thereof, and recording each unit-information as a hologram on a recording medium with a plurality of reference light beams one by one or a single reference light beam such that one-to-one different combinations of said single unit-information input position and said plurality of reference light beams or one-to-one different combinations of said plurality of unit-information input positions and said single reference light beam are used in sequence to record a series of holograms aligned on a track of the recording medium.

2. A method according to claim 1 wherein said recording step includes using a single reference light beam and N successive unit-informations are supplied sequentially to spatially separate N unit-information input positions.

3. A method according to claim 1 wherein said recording step is carried out by using a plurality (M) of reference light beams having different respective incident angles, M being less than or equal to the number N, and N/M, (an integer) spatially separated unit-information input positions, N/M being less than the number N, such that all possible one-to-one combinations of said reference light beams and unit-information input positions is equal to the number N, and wherein a first hologram is recorded by using said first unit-information input position and a second reference light beam or by using a second unit-information input position the first reference light beam, and other holograms are recorded in sequence in a similar procedure by using in sequence all said possible combinations of the unit-information input positions and the reference light beams.

4. A method according to claim 1 wherein said recording step is carried out by using a plurality (M) of reference light beams having different incident angles, where M is less than or equal to the number 2N, and a single or a plurality 2N/M, (an integer) of unit-information input positions, where 2N/M is less than the number 2N, all possible one-to-one combinations of said reference light beams and unit information input positions being equal to the number 2N and divided into two channels each including N of said combinations, recording holograms on odd-numbered tracks by using one channel of N of said combinations and holograms on even-numbered tracks by using the other channels of N of said combinations, respectively.

5. A method according to claim 1 wherein the number N is 2, 3 or 4.

6. A method according to claim 1 wherein said recording step includes using a single reference light beam and two spatially separated input channels each of N spatially separated unit-information input positions, successive unit-informations being supplied sequentially to the N unit-information input positions of the first channel to record holograms of said units of information as a first track on the recording medium, and subsequent successive unit-informations being supplied sequentially to the N unit-information input positions of the second channel to record holograms of said units of information as a second track adjacent said first track, and any subsequent tracks being recorded such that all even numbered tracks are made by exposure to the second channel and all odd numbered tracks by exposure to said first channel.

7. A method according to claim 6 wherein adjacent tracks are recorded in a partially overlapped manner.

8. A method for reproducing information through an inverse Fourier transform by continuously scanning holograms recorded on a recording medium as a series of holograms comprising the steps of;

sequentially scanning adjacent said holograms in a track by a reproducing light beam having a diameter $r_1$ in the direction of scan which meets the relation $$L(\epsilon-l, 0) < r_1 < (2N-1)\epsilon-l$$

where $L(\epsilon-l, 0)$ represents value of either $\epsilon-l$ or 0 whichever is larger, $l$ is the length of a hologram in the direction of scan, $\epsilon$ is the hologram-to-hologram separation, and N is the number of units of information in each group of information, and said reproducing light beam having a diameter $r_2$ in the transverse direction to the scan direction which is confined not to illuminate a second neighbouring track, and among a plurality of images reproduced on a plurality (N or 2N) of substantially spaced image positions on the image plane, by means of photoelectric transducer devices installed thereon, sequentially reading out images free from optical crosstalk with images reproduced on the same image positions from holograms in which recorded units of information are designated with the same information unit numbers regardless of information group numbers.

9. A method according to claim 8 wherein the N image positions are arranged in one channel on the image plane and the diameter $r_2$ of the reproducing light beam is set not to overlap a first neighbouring track.

10. A method according to claim 8 wherein two channels each of N image positions are arranged in the image plane, reading out holograms on odd-numbered tracks and even-numbered tracks with one and the other channels, respectively, of N photoelectric tranceducer devices installed on said image positions.

11. A hologram reproducing method according to claim 8 wherein each unit-information imaged from holograms is arranged in a two-dimensional bit array.

12. A system for recording information as Fourier transform holograms comprising
a coherent light source,
a light splitting means for splitting a light beam from said coherent light source into a reference light beam and an object light beam,
information input means disposed in a plane perpendicular to the optical axis of said object light beam for sequentially exposing discrete units of information to said object light beam, said information input means having a single or a plurality of unit-information input positions substantially spaced with one another,
information supply means to supply said units of information to said information input means, said information supply means processing original information into a form in which the original information is divided into a number of groups each consisting of a predetermined number N, (larger than or equal to two) of said units of information, each unit consisting of a given amount of information, each of said units of information being supplied sequentially to said information input means as a spatial pattern,
lens means for converging said object light beam on a Fourier transform plane,
a recording medium located in the Fourier transform plane formed by said lens means, means for directing said reference light beam to said Fourier transform plane with a fixed single angle or with a plurality of predetermined incident angles sequentially so as to cause interference with said object light beam on said recording medium, driving means for moving said recording medium in said Fourier transform plane, and a control circuit connected to said information supply means, said reference light directing means and said driving means for achieving cooperation therebetween to form a series of Fourier transform holograms on said recording medium, such that one-to-one different combinations of said single unit-information input position and said plurality of incident angles of said reference light beam or one-to-one different combinations of said plurality of unit-information input positions and said fixed single incident angle of said reference light beam are used in sequence to record said series of holograms, each of said holograms storing a respective unit-information supplied in a predetermined sequence.

13. A system according to claim 12, wherein said information input means has the same number of substantially spaced unit-information input positions as the number (N) of information units in each group of the original information, and said reference light directing means produces a single reference light beam having a predetermined incident angle with respect to the Fourier transform plane, and wherein said control circuit controls such that the $k$th unit-information input position of said information input means whereby the original information is recorded as successive holograms forming a single track or a plurality of tracks non-overlapping on the recording medium.

14. A system according to claim 12, wherein said information input means has unit-information input positions (2N) two times the number of units of information (N) constituting each group of the original information and said unit-information positions are aligned in two channels each consisting of N unit-information positions, and wherein said reference light directing means produces a single reference light having a fixed incident angle with respect to the Fourier transform plane, and wherein said control circuit controls its associated means such that the $k$th unit-information of each of a predetermined number of groups of information are supplied to the $k$th input position of a first channel of said information input device sequentially for recording on odd-numbered tracks of said recording medium and then the $k$th unit-information of each of another predetermined number of groups of information are supplied to the $k$th input position of a second channel of said information input device sequentially for recording on even-numbered tracks of said recording medium, and wherein adjacent tracks are separated or partially overlapped with each other.

15. A system according to claim 12, wherein said information input means has a plurality of unit-information input positions N/M less than the number of units of information constituting one group of information, where M is an integer larger than one and N/M is an integer larger than or equal to 1 and less than N, and wherein said reference light directing means produces a reference light which takes different M incident angles with respect to the Fourier transform plane, and wherein said control circuit controls associated means such that N different combinations are formed by all of said M incident angles and all of said N/M unit-information input positions and the $k$th unit-information of each group is recorded by use of the $k$th combination of said N different combinations so that adjacent tracks on said record medium do not overlap.

16. A system according to claim 12, wherein said information input means has a plurality of unit-information input positions 2N/M less than the two times the number of units of information constituting one group of information, where M is an integer larger than one and 2N/M is larger than or equal to 1 and less than 2N, and wherein said reference light directing means produces a reference light which takes M different incident angles with respect to the Fourier transform plane, and wherein said control circuit controls associated means such that 2N different combinations divided into two channels each including N combinations by all of said M incident angles and all of said 2N/M unit-information input positions and the $k$th unit-information of each of a predetermined number of groups is recorded on odd-numbered tracks by use of the $k$th combination of a first channel of N combinations and the $k$th unit-information of each of another predetermined number of groups is recorded on even-numbered tracks by use of the $k$th combination of a second channel of N combinations so that adjacent tracks are separated or partially overlapped.

17. A system for reproducing information from holograms recorded on a track or tracks of a record medium comprising a light source for producing a reproducing light beam having a beam diameter $r_1$ in the direction of scan, which meets the following relation:

$$L(\epsilon-l, 0)<r_1<(2N-1)\epsilon-l$$

where $L(\epsilon-l, 0)$ means value of either $\epsilon-l$ or 0 which is larger, $l$ is the same of the hologram in the direction of scan, $\epsilon$ is the hologram-to-hologram separation, and N is the number of units of information of each group of information, and said reproducing light beam having a beam diameter $r_2$ in the transverse direction to the scan direction which is confined not to illuminate second neighbouring tracks, means to scan the holograms relative to said reproducing light beam, means to effect the inverse Fourier transform of a refracted light of said reproducing light beam through the holograms, photoelectric transducer means having a plurality of unit-information detecting positions substantially, spaced and disposed on the inverse Fourier transform plane, readout means connected to said photoelectric transducer means and including a timing mark detection circuit and switching circuit for reading out each of units of information reproduced by said photoelectric transducer means sequentially, and control circuit connected to said scan means and said readout means to control cooperation therebetween.

18. A system for reproducing according to claim 17, wherein the holograms recorded on a record medium are constituted by a single or a plurality of tracks without overlapping between adjacent tracks, wherein the size of said $r_2$ is selected not to overlap first neighbouring track, and said photoelectric transducer means has N unit-information detecting devices.

19. A system for reproducing according to claim 17, wherein holograms recorded on a record medium are constituted by a plurality of tracks separated from or overlapping partially with each other, wherein the size of said $r_2$ is selected as large as at least not to overlap second neighbouring track, and said photoelectric transducer means has 2N unit-information detecting devices.

20. A Fourier transform holograms recording and reproducing system comprising;

a coherent light source, a light splitting means for splitting a light beam from said coherent light source into a reference light beam and an object light beam, information input means disposed in a plane perpendicular to the optical axis of said object light beam for sequentially exposing information to said object light beam, said information input means having one or a plurality of unit-information input positions, information supply means to supply original information to said information input means, said information supply means processing and storing the original information in a form in which the original information is divided into a number of groups each consisting of a predetermined number (N, larger than or equal to two) of units of information each consisting of a given amount of information, each of said unit-information being supplied sequentially to said information input means as a spatial pattern, lens means for converging said object light beam on a Fourier transform plane, a recording medium located in the Fourier transform plane formed by said lens means, means for directing said reference light beam to said Fourier transform plane with a single or one of a plurality of predetermined incident angles so as to cause interference with said object light beam on said recording medium, driving means for moving said recording medium in said Fourier transform plane, a control circuit connected to said information supply means, and reference light directing means and said driving means for achieving cooperation therebetween to form a series of Fourier transform holograms on said recording medium, each of said holograms containing corresponding unit-information supplied in a predetermined sequence, said formation of a series of holograms being performed by interferences of all possible N or 2N one-to-one combinations among said unit-information input means and said reference light beams, a light source for producing a reproducing light beam having a beam diameter $r_1$ in the direction of scan, which meets the following relation:

$$L(\epsilon - l, 0) < r_1 < (2N - 1)\epsilon - l$$

where $L(\epsilon - l, 0)$ means value of either $\epsilon - l$ or 0 which is larger, $l$ is the size of the hologram in the direction of scan, $\epsilon$ is the hologram-to-hologram separation, and N is the number of units of information of each group of information, and said reproducing light beam having a beam diameter $r_2$ in the transverse direction to the scan direction which is confined not to illuminate second neighbouring tracks, means to scan the holograms relative to said reproducing light beam, means to effect the inverse Fourier transform of a refracted light of said reproducing light beam through the holograms, photoelectric transducer means having a plurality of unit-information detecting devices substantially spaced and disposed on the inverse Fourier transform plane, readout means connected to said photoelectric transducer means and including a timing mark detection circuit and switching circuit for reading out each of units of information reproduced by said photoelectric transducer means sequentially, and control circuit connected to said scan means and said readout means to control cooperation therebetween.

* * * * *